(12) United States Patent
Fried

(10) Patent No.: US 7,261,348 B1
(45) Date of Patent: Aug. 28, 2007

(54) TONGS WITH ADJUSTABLE JAW SPACING

(76) Inventor: Brian Fried, 9 Richbourne La., Melville, NY (US) 11747

( * ) Notice: Subject to any disclaimer, the term of this patent is extended or adjusted under 35 U.S.C. 154(b) by 0 days.

(21) Appl. No.: 11/385,527

(22) Filed: Mar. 21, 2006

(51) Int. Cl.
*A47G 21/10* (2006.01)
*A47J 43/28* (2006.01)

(52) U.S. Cl. ........................................ 294/16; 294/99.2
(58) Field of Classification Search ................ 294/16, 294/116, 86.27, 86.29, 99.2, 106, 110.1, 110.2; D7/686; 24/313, 317, 318, 325, 344, 506
See application file for complete search history.

(56) References Cited

U.S. PATENT DOCUMENTS

| | | | |
|---|---|---|---|
| 2,864,645 A * | 12/1958 | Meldrum | 294/106 |
| 3,211,488 A * | 10/1965 | Duranel | 294/116 |
| 4,768,288 A | 9/1988 | Culbertson | |
| 5,199,756 A | 4/1993 | Bartlett et al. | |
| 5,934,721 A | 8/1999 | Walde | |
| 6,089,631 A * | 7/2000 | Thurlow et al. | 294/99.2 |
| 6,092,847 A * | 7/2000 | Kwan | 294/16 |
| 6,536,819 B2 | 3/2003 | Wang et al. | |
| D477,189 S * | 7/2003 | Bull et al. | D7/686 |
| 6,726,263 B2 | 4/2004 | Wang et al. | |
| D509,413 S * | 9/2005 | Marsden et al. | D7/686 |
| 2004/0239129 A1 * | 12/2004 | Sumter et al. | 294/99.2 |

* cited by examiner

*Primary Examiner*—Patrick Mackey
*Assistant Examiner*—Paul T. Chin
(74) *Attorney, Agent, or Firm*—Sturm & Fix LLP

(57) ABSTRACT

Adjustable tongs include a slidably movable adjustment plate with a plurality of spaced notches that act in cooperation with a tab at the proximal end of the tong arm to selectively limit the spacing between the tong jaws. The notches are longitudinally spaced along the outer edges of the adjustment plate and become progressively deeper from one end of the plate to the other. An elongated longitudinal slot in the plate engages the pivot pin connecting the pair of arms which allows longitudinal movement of the plate to one of a number of selected positions where the tabs of the tong arms engage one of the sets of laterally aligned notches. Engagement of the tab with a selected one of the sets of notches allows a corresponding selected spacing between the jaws. The deeper the notch, the greater the allowed spacing between the jaws.

7 Claims, 2 Drawing Sheets

TONGS WITH ADJUSTABLE JAW SPACING

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of kitchen utensils, and more particularly to adjustable tongs.

2. Description of Related Art

Every time a person uses tongs for serving salad or pasta, etc., the server has difficulty with measuring the portions properly. Some plates or bowls may get too much, and some may be short-changed and not get a full plate. This can happen in the home or in restaurant kitchens.

As can be seen by reference to the following U.S. Pat. Nos. 4,768,288; 5,199,756; 5,934,721; 6,536,819 and 6,726,263, the prior art is replete with myriad and diverse tongs.

While all of the aforementioned prior art constructions may be adequate for the basic purpose and function for which they have been specifically designed, they are uniformly deficient with respect to their failure to provide simple, efficient, and practical adjustable tongs.

As a consequence of the foregoing situation, there has existed a longstanding need for a new and improved adjustable tongs and the provision of such a construction is the stated objective of the present invention.

BRIEF SUMMARY OF THE INVENTION

Briefly stated, the present invention provides adjustable tongs, including a slidably movable adjustment plate with a plurality of spaced notches that act in cooperation with a tab at the proximal end of the tong arm to selectively limit the spacing between the tong jaws. The notches are longitudinally spaced along the outer edges of the adjustment plate and become progressively deeper from one end of the plate to the other. An elongated longitudinal slot in the plate engages the pivot pin connecting the pair of arms which allows longitudinal movement of the plate to one of a number of selected positions where the tabs of the tong arms engage one of the sets of laterally aligned notches. Engagement of the tab with a selected one of the sets of notches allows a corresponding selected spacing between the jaws. The deeper the notch, the greater the allowed spacing between the jaws.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
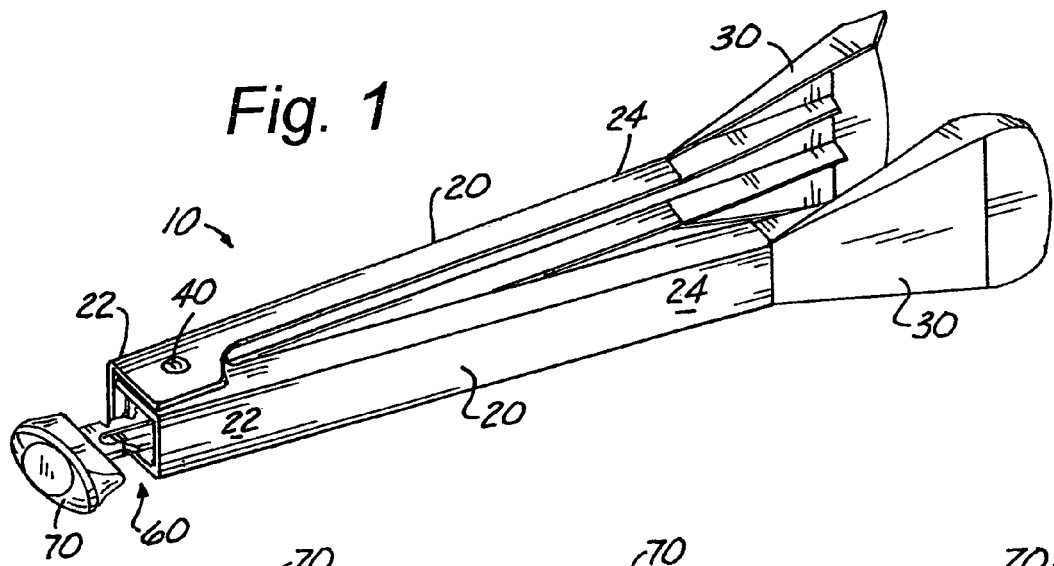
FIG. 1 is a perspective view showing the adjustable tongs of the present invention.

As can be seen by reference to the drawings, and in particular to FIG. 1, the adjustable tongs that form the basis of the present invention are designated generally by the reference number 10.

The tongs 10 include a pair of arms 20 having a proximal end 22 and a distal end 24. A jaw 30 is disposed at the distal end 24 of each of the arms 20. A pivot pin 40 pivotally connects the arms 20 inward from their proximal ends 22, and movement of the arms 20 moves the jaws 30 between an open position and a closed position. A spring 50 biases the jaws 30 to the open position.

As best shown in FIGS. 5-8, a tab 26 extends inwardly from the arms 20 near the proximal ends 22, and a high friction rubber insert 28 is carried on the interior surface of the arms 20 closely spaced from the tabs 26.

Figures 2, 3, 4:
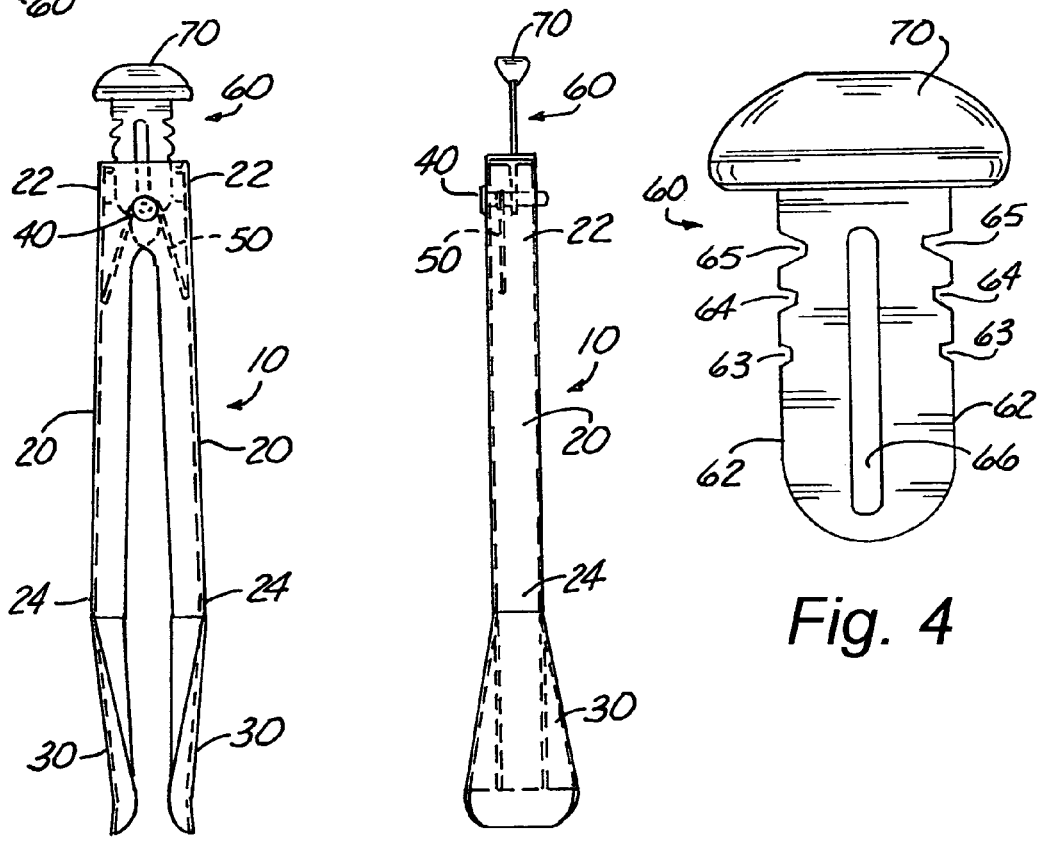
FIG. 2 is a front elevational view thereof.
FIG. 3 is a side elevational view thereof.
FIG. 4 is an enlarged front elevational view of the adjustment plate.
Figure 5:
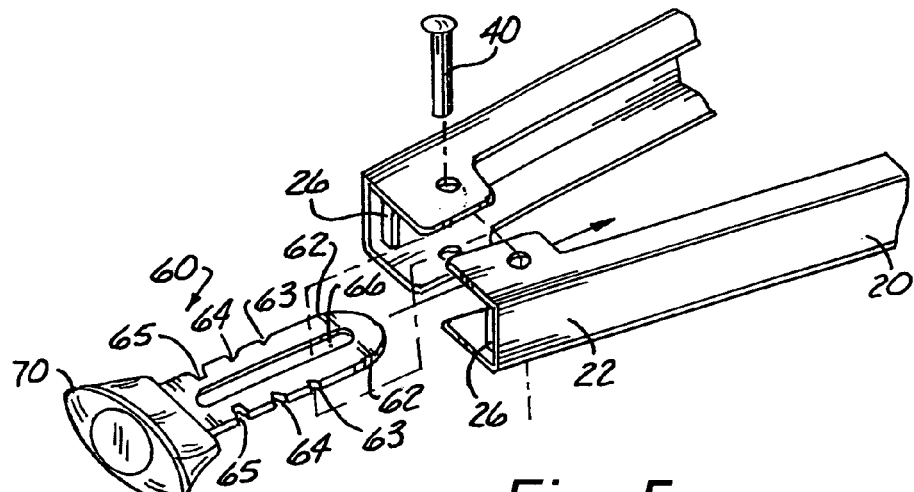
FIG. 5 is a partial exploded perspective view showing the connection of the arms of the tongs and the adjustment plate.

FIG. 4 shows the adjustment plate 60 that has outer edges 62 that carries a series of longitudinally spaced, laterally aligned notches 63, 64 and 65 having progressively greater depths. An elongated longitudinal closed slot 66 is formed between the outer edges 62, and a high friction rubber finger grip 70 is formed at the end of the plate 60.

Figures 6, 7, 8:
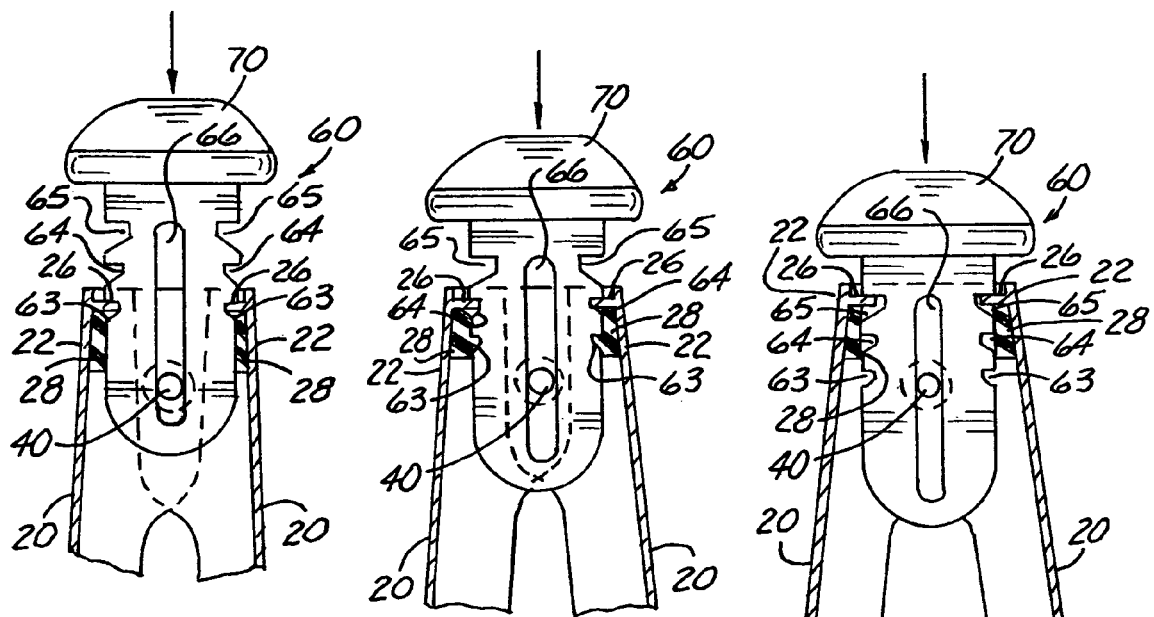
FIG. 6 is a front elevational sectional view showing the adjustment plate in a position allowing limited opening of the arms of the tongs.
FIG. 7 is a view similar to FIG. 6, but showing a larger opening of the arms.
FIG. 8 is a view similar to FIGS. 6 and 7, but showing the largest opening of the arms.

As shown in FIGS. 5-8, the slot 66 of the adjustment plate 60 receives the pivot pin 40 that also pivotally connects the arms 20. FIG. 6 shows the adjustment plate 60 positioned so that the tabs 26 engage the notches 63 which have the shallowest depth and limits the spacing between the jaws 30 to its narrowest spacing. FIG. 7 shows the plate 60 pushed inward so that the tabs 26 now engage the notches 64 which have a greater depth and thus allow a greater spacing between the jaws 30. FIG. 8 shows the plate 60 pushed further in where the tabs 26 engage the notches 65 which have the greatest depth and allow the greatest spacing between the jaws 30. The adjustment plate 60 is moved from one selected position to another by grasping the finger grip 70 and simply pushing or pulling as required to move to the desired position. The contact of the outer edges 62 with the high friction rubber insert 28 on the interior surface of the arms 20 acts to stabilize and hold the adjustment plate 60 in the selected position.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. Adjustable tongs, comprising:
a pair of arms, each of the pair of arms having a proximal end and a distal end;
a jaw disposed at the distal end of each of the pair of arms;
a pivot pin disposed to engage and pivotally connect the pair of arms inward from the proximal ends, wherein pivotal movement of the arms moves the jaws between an open position and a closed position;
a tab disposed to extend inwardly from each of the pair of arms near the proximal end;
a slidably movable adjustment plate having outer edges and an elongated longitudinal slot disposed intermediate the outer edges, wherein the slot slidably receives the pivot pin, and wherein each of the outer edges includes a plurality of longitudinally spaced laterally aligned notches disposed to selectively engage a tab of one of the pair of arms when the adjustment plate is moved to a first adjusted position, wherein engagement of the tabs in the notches limits spacing between the jaws when the jaws are in the open position, each of the plurality of laterally aligned notches having a depth distinct from a depth of another of the plurality of laterally aligned notches, whereby engagement of the tabs in the laterally aligned notches having a greater depth allows a greater spacing between the jaws when the jaws are in the open position.

2. The tong of claim 1, wherein the adjustment plate includes an enlarged finger grip disposed at its end.

3. The tongs of claim 2, wherein the finger grip includes a high friction surface.

4. The tongs of claim 3, wherein the high friction surface is rubber.

5. The tongs of claim 1, wherein the jaws are biased to the open position.

6. The tongs of claim 5, wherein the jaws are spring biased.

7. The tongs of claim 6, wherein high friction inserts are attached to the arms near the proximal ends, and are disposed to engage the outer edges of the adjustment plate.

* * * * *